US009913246B1

(12) United States Patent
Carey et al.

(10) Patent No.: US 9,913,246 B1
(45) Date of Patent: Mar. 6, 2018

(54) INTELLIGENT NOTIFICATION REDIRECTION

(71) Applicant: International Business Machines Corporation, Armonk, NY (US)

(72) Inventors: James E. Carey, Rochester, MN (US); Jim C. Chen, Rochester, MN (US); Charlie M. Jonas, St. Louis, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/430,333

(22) Filed: Feb. 10, 2017

(51) Int. Cl.
*H04W 4/02* (2009.01)
*H04W 68/00* (2009.01)
*H04B 1/3827* (2015.01)
*H04L 12/801* (2013.01)
*G06K 9/00* (2006.01)

(52) U.S. Cl.
CPC ...... *H04W 68/005* (2013.01); *G06K 9/00228* (2013.01); *H04B 1/385* (2013.01); *H04L 47/29* (2013.01); *H04W 4/023* (2013.01); *H04W 4/026* (2013.01)

(58) Field of Classification Search
CPC ... H04W 68/00; H04W 68/005; H04W 4/023; H04W 4/026; G06K 9/00228; H04B 1/385; H04L 47/29
USPC ........................................................ 455/417
See application file for complete search history.

(56) References Cited

U.S. PATENT DOCUMENTS

| 6,618,110 | B2 | 9/2003 | Zondervan et al. |
| 7,378,939 | B2 | 5/2008 | Sengupta et al. |
| 8,131,848 | B1 * | 3/2012 | Denise ................. H04M 19/04 709/224 |
| 9,391,994 | B2 | 7/2016 | Matus |
| 9,603,123 | B1 * | 3/2017 | Jackson ............ H04M 1/72569 |
| 2014/0258883 | A1 * | 9/2014 | Duarte .............. G06F 17/30598 715/752 |
| 2014/0320387 | A1 * | 10/2014 | Eriksson ................. G06F 3/017 345/156 |
| 2015/0365540 | A1 | 12/2015 | Davis et al. |

FOREIGN PATENT DOCUMENTS

JP 2013093893 A * 5/2013

OTHER PUBLICATIONS

Rogerson, J. "Android Wear: everything you need to know (Updated to include Android Wear 2.0)", published Aug. 9, 2016, accessed Sep. 6, 2016, 17 pages. <http://www.techradar.com/news/wearables/google-android-wear-what-you-need-to-know-1235025>.

* cited by examiner

*Primary Examiner* — Marisol Figueroa
(74) *Attorney, Agent, or Firm* — Patterson + Sheridan, LLP

(57) ABSTRACT

Systems, methods, and computer program products to perform an operation comprising receiving, by a mobile device, an indication to output a notification, determining an orientation of the mobile device, determining a location of a wearable device relative to the mobile device, and selecting, based on the determined orientation of the mobile device and the location of the wearable device relative to the mobile device, at least one of the mobile device and the wearable device to output the notification.

17 Claims, 8 Drawing Sheets

INTELLIGENT NOTIFICATION REDIRECTION

BACKGROUND

The present invention relates to mobile computing devices, and more specifically, to mobile computing devices which provide intelligent notification redirection to wearable devices.

Wearable devices such as smart watches and personal fitness devices often synchronize with mobile devices such as smartphones and tablets. Applications executing on mobile devices often generate and output notifications targeted at the user. However, these notifications are often unintelligently outputted, e.g., on the wrong device, or on both the user's mobile device and the wearable device, causing user distraction and frustration over incorrectly targeted notifications.

SUMMARY

In one embodiment, a method comprises receiving, by a mobile device, an indication to output a notification, determining an orientation of the mobile device, determining a location of a wearable device relative to the mobile device, and selecting, based on the determined orientation of the mobile device and the location of the wearable device relative to the mobile device, at least one of the mobile device and the wearable device to output the notification.

In another embodiment, a mobile device comprises a processor and a memory storing instructions, which when executed by the processor, performs an operation comprising receiving, by the mobile device, an indication to output a notification, determining an orientation of the mobile device, determining a location of a wearable device relative to the mobile device, and selecting, based on the determined orientation of the mobile device and the location of the wearable device relative to the mobile device, at least one of the mobile device and the wearable device to output the notification.

In another embodiment, a computer-readable storage medium has computer-readable program code embodied therewith, the computer-readable program code executable by a processor to perform an operation comprising receiving, by a mobile device, an indication to output a notification, determining an orientation of the mobile device, determining a location of a wearable device relative to the mobile device, and selecting, based on the determined orientation of the mobile device and the location of the wearable device relative to the mobile device, at least one of the mobile device and the wearable device to output the notification.

DETAILED DESCRIPTION

Embodiments disclosed herein intelligently output notifications on one or more of a mobile device and a wearable device based on the position and orientation of the mobile device in relation to the user and the wearable device. For example, if a user's smartphone is placed with the screen facing down and/or out of proximity from the user, notifications may be outputted on the wearable device. Similarly, if the smartphone is oriented with the screen facing up, the notifications may be outputted on the smartphone instead of the wearable device. If the notification includes private information, the smartphone may perform facial recognition to ensure that the user is in proximity of the smartphone prior to outputting the notification. If the facial recognition analysis determines that the user is not present, or an unknown user is not present, the notification may be outputted on the wearable device instead of the smartphone to protect the privacy of the information.

Figure 1A:
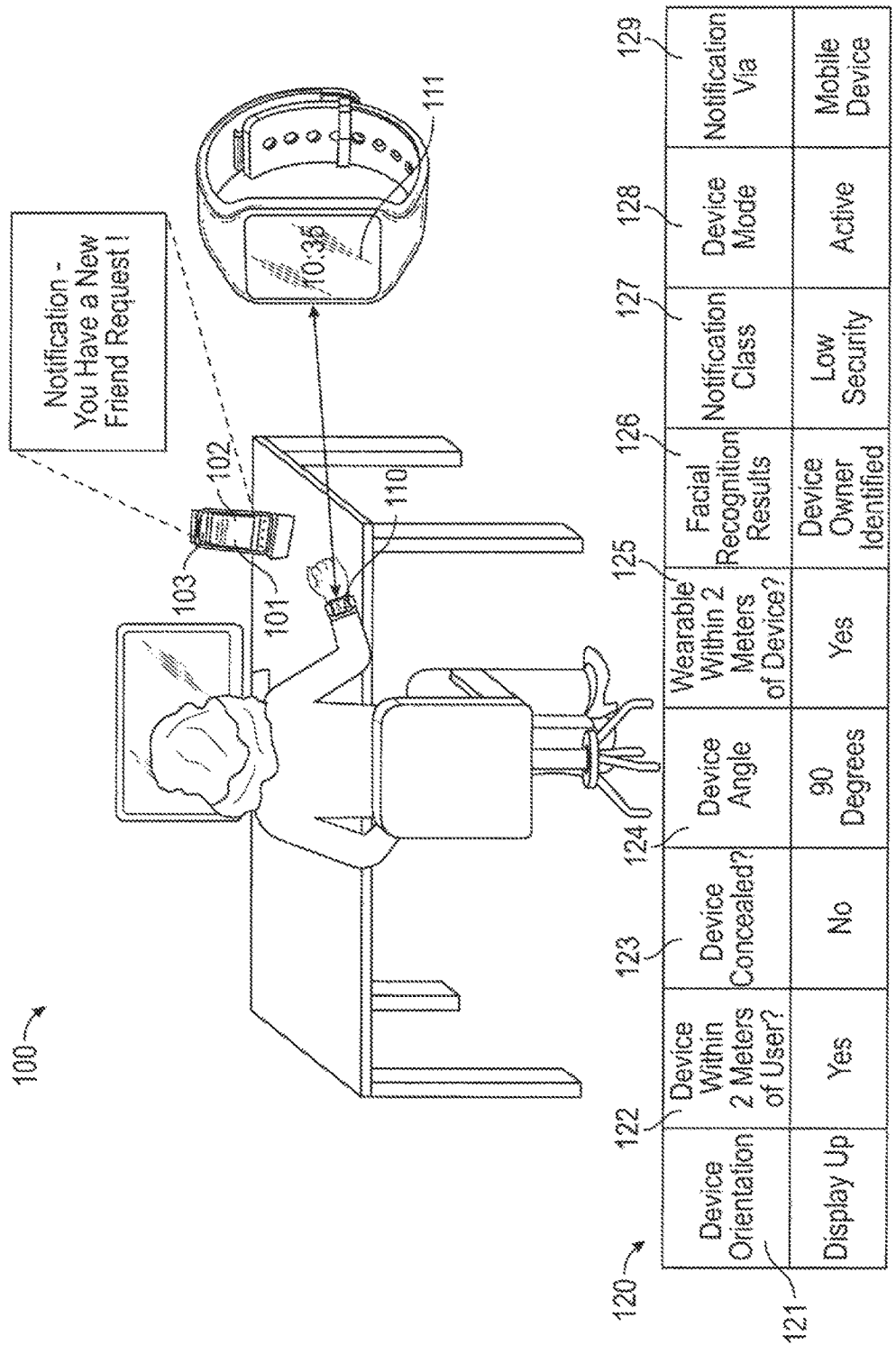
FIGS. 1A-1D illustrate an example system for providing intelligent notification redirection, according to various embodiments.

FIG. 1A illustrates illustrate an example system 100 for providing intelligent notification redirection, according to one embodiment. As shown, the system 100 includes a mobile device 101 which is worn by a user and is communicably coupled to a wearable device 110. The mobile device 101 is representative of any type of mobile device, such as a smartphone, tablet, portable gaming console, and the like. The wearable device 110 is representative of any type of wearable device, such as a smartwatch, personal fitness device, wearable toys, clothing with integrated devices, headphones, and the like. As shown, the mobile device 101 and the wearable device 110 include a respective display device 102, 111. The display devices 102, 111 are representative of any type of display device. As shown, the mobile device 101 further includes a camera 103 and a data store of configuration data 120. The configuration data 120 includes a plurality of rules and parameters used by the mobile device 101 to determine whether to output notifications on the mobile device 101 and/or the wearable device 110.

Generally, the mobile device 101 may execute a plurality of different applications (not pictured), such as email clients, text messaging applications, and social media applications. These applications and the operating system (not pictured) of the mobile device 101 may generate notifications directed at a user of the mobile device to inform the user of some event, e.g., the arrival of an email or text message. The notifications may include tactile, visual, and/or audio feedback targeted at the user. Conventionally, however, the notifications were outputted with no consideration as to whether the mobile device 101 or wearable device 110 is the more appropriate device to output the notification. Advantageously, the mobile device 101 leverages the configuration data 120 to determine whether to output a given notification on the mobile device 101 and/or the wearable device 110. For example, a rule in the configuration data 120 may specify to output notifications on the mobile device 101 when each of the following determinations are made: (i) the wearable device 110 is within a predefined distance of the mobile device 101, (ii) the mobile device 101 is placed with the display 102 facing up (e.g., has an orientation of 0 degrees, plus or minus 10 degrees), and (iii) no users are detected in image data provided by the camera 103.

As shown, FIG. 1A depicts an example row of configuration data 120, which includes a plurality of columns 121-129. As shown, column 121 reflects a current orientation of the mobile device 101, column 122 indicates whether the mobile device 101 is within a threshold distance (e.g., 2 meters) of the user, column 123 indicates whether the mobile device 101 is concealed (e.g., in a bag, purse, or pocket), column 124 indicates an angle of orientation of the mobile device 101, column 125 indicates whether the wearable device 110 is within a threshold distance of the user, column 126 indicates the results of a facial recognition analysis, column 127 reflects a notification class for the notification (e.g., high, medium, or low security), column 128 reflects a current operating mode of the mobile device 101, and column 129 indicates where the notification should be outputted via (e.g., the mobile device 101 and/or the wearable device 110).

Generally, the mobile device 121 may populate the row of configuration data 120 with a value for each column 121-129 to determine whether to output a notification on the mobile device 101 and/or the wearable device 110. For example, as shown in column 121, the mobile device 101 has determined that the mobile device 101 is oriented with the display 102 facing up. In at least one embodiment, the mobile device 101 uses data from an accelerometer (not pictured) to determine the current orientation of the mobile device 101. The mobile device 101 has also determined that the mobile device is within 2 meters of the user, as reflected by column 122 of the configuration data 120. In one embodiment, the mobile device 101 performs facial recognition on image data provided by the camera 103 to determine whether the user is depicted in the image data, and is therefore within the threshold distance of the mobile device. In another embodiment, the mobile device 101 may associate the location of the wearable device 110 with the user. Therefore, if the mobile device 101 determines that the wearable device 110 is within the threshold distance of the mobile device 101, the mobile device 101 may further determine that the user is also within the threshold distance of the mobile device 101. In at least one embodiment, the mobile device 101 uses wireless communications signals (e.g., Wi-Fi®, Bluetooth®, etc.) to determine the distance to the wearable device 110. Therefore, as shown in column 125, the mobile device 101 has determined that the distance from the mobile device 101 to the wearable device 110 is within a threshold distance (e.g., 2 meters).

Furthermore, as shown in column 123, the mobile device 101 has determined that the mobile device 101 is not concealed. In at least one embodiment, the mobile device 101 analyzed image data from the camera 103 to determine whether the mobile device 101 is concealed (e.g., in a pocket or purse). For example, the mobile device 101 may determine the level of light exposure in the image data provided by the camera 103. If the level of light in the image data is below a threshold, the mobile device 101 may determine that the mobile device 101 is concealed. Similarly, the mobile device 101 may also consider as whether the image data shows opaqueness or weak translucency, either of which may indicate that the mobile device 101 is concealed.

Furthermore, as shown in column 124, the mobile device 101 has determined that the angle of the mobile device is 90 degrees, which may indicate that the mobile device 101 is being held or is placed against an object such as a device stand. If the angle of the mobile device permits (e.g., is within 0 to 90 degrees, indicating the display 102 is face up), the mobile device 101 may determine to use the camera 103 to perform facial recognition. Therefore, in column 126, the mobile device 101 has applied a facial recognition algorithm of image data from the camera to one or more known images of the owner of the mobile device 101 and/or wearable device 110 to determine that the device owner is in the image data. As shown in column 127, the mobile device 101 has determined that the notification class for the notification is "low security." The mobile device 101 may determine the notification class based on a notification class assigned to the notification by the entity (e.g., application, operating system, etc.) that generated the notification, based on a notification class assigned to the entity that generated the notification, and/or an analysis of the contents of the notification. For example, the mobile device 101 may assign a high level of security to a text message notification that reads "your security code is abcd1234" based on the presence of secure information in the message. As another example, the mobile device 101 may assign a low level of security to a social media notification that reads "your friend has invited you to an event next month" based on the concepts contained in the notification. Furthermore, as shown in column 128, the mobile device 101 has determined that the mobile device 101 is in an active mode.

As shown in column 129, the mobile device 101 has determined to output the notification on the mobile device 101. Therefore, as shown, the display 102 of the mobile device 101 includes a notification indicating that the user has a new friend request. Generally, the mobile device 101 determines whether to output the notification on the mobile device 101 and/or the wearable device 110 based on one or more of the columns 121-128 and/or one or more rules. For example, a first rule in the configuration data 120 may require the outputting of notifications on the mobile device 101 if the mobile device 101 is oriented with the screen facing up, and the facial recognition analysis identifies the owner of the mobile device 101 in the image data provided by the camera.

Figure 1B:
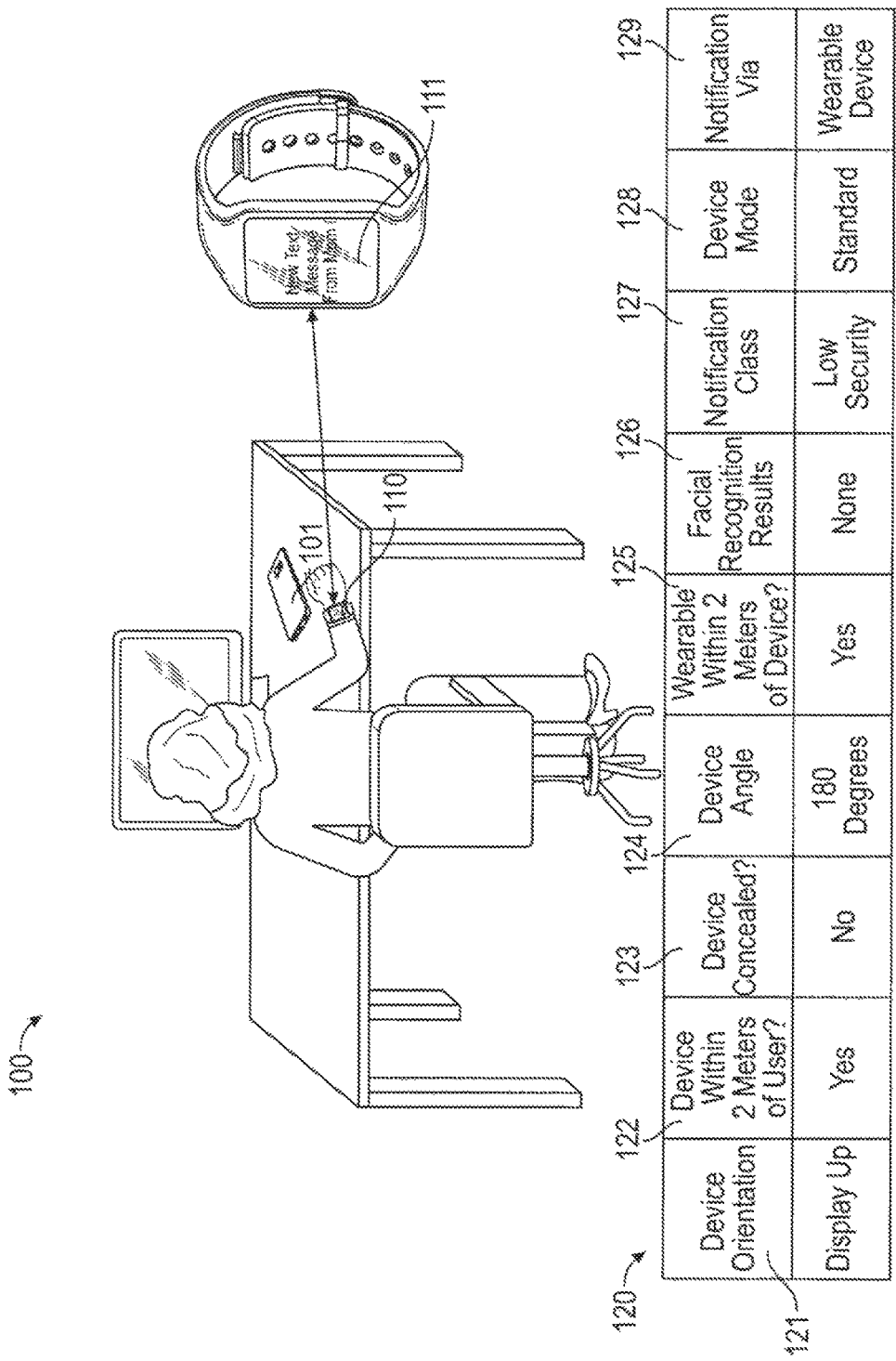

FIG. 1B depicts an embodiment where the mobile device 101 is placed with the display 102 facing down (e.g., face-down on a table or desk), and a notification is directed to the wearable device 111 as a result. In at least one embodiment, a rule in the configuration data 120 indicates that if the mobile device 101 is oriented with the screen facing down, all notifications must go to the wearable device 110. As shown, the device orientation column 121 of the configuration data 120 reflects that the device has the display 102 facing down, while the device angle 124 is 180 degrees. Therefore, the mobile device 101 may accordingly determine to output the notification on the wearable device.

Figure 1C:
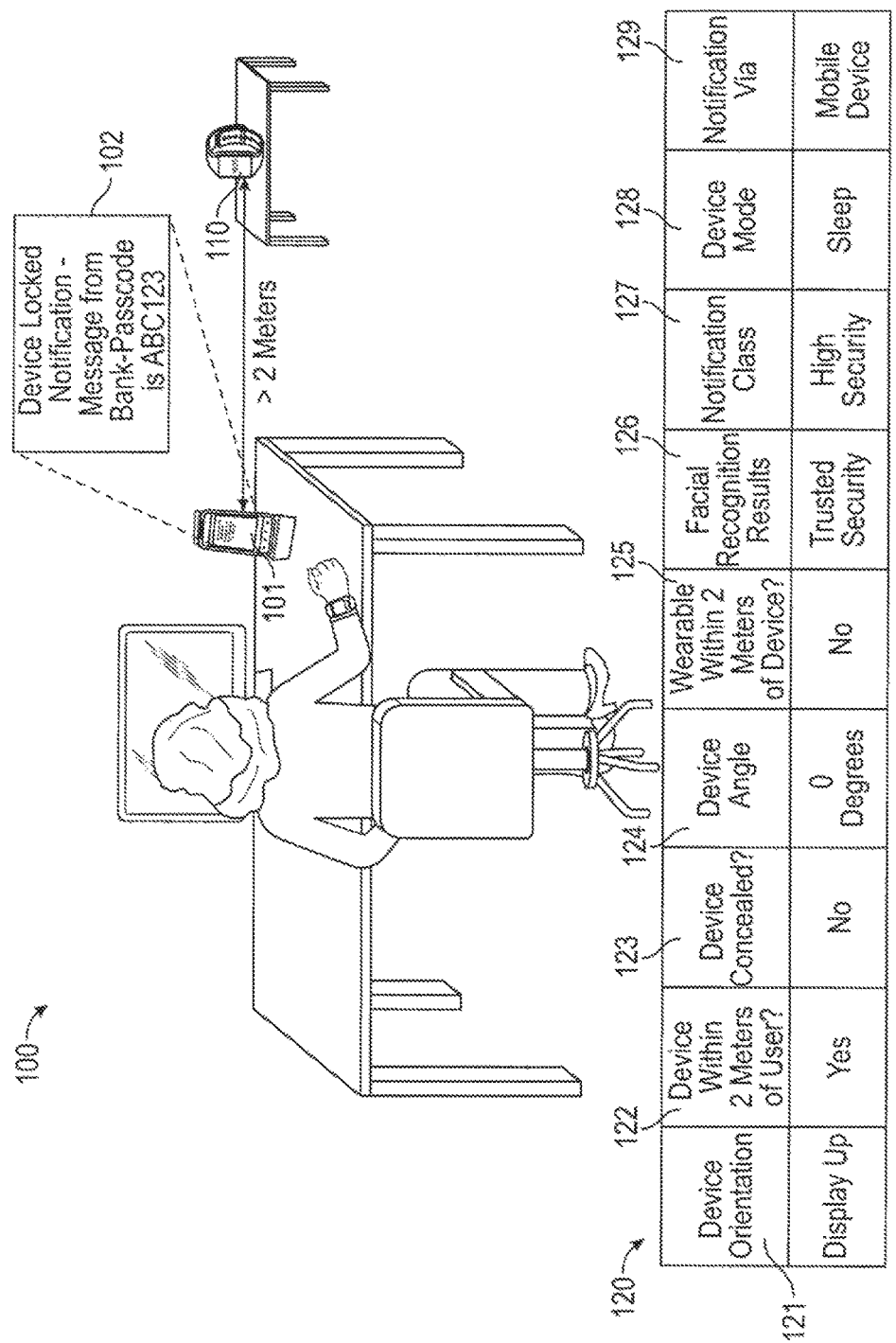

FIG. 1C depicts an embodiment where a notification is outputted on the display 102 of the mobile device 101. As shown, the mobile device 101 has determined in column 125 that the wearable device 110 is not within 2 meters of the mobile device 101. As such, the mobile device 101 may not be able to transmit an indication of a notification to the wearable device 110. Furthermore, column 128 reflects that the mobile device 101 is in sleep mode. However, as shown in column 122, the mobile device 101 has determined that a user is in proximity of the mobile device 101 based on image data provided by the camera 103. In some embodiments, the presence of a person would cause the mobile device 101 to output the notification on the mobile device 101, even though the wearable device 110 is not in range of the mobile device 101. Furthermore, in some embodiments, a rule in the configuration data 120 may require the mobile device 101 to refrain from outputting the notification unless a trusted user (e.g., the owner of the device, a spouse of the owner, etc.) is identified via facial recognition applied to the image data provided by the camera 103. In some embodiments, a rule in the configuration data 120 may require identification of a trusted user if the notification class 127 is of a specified type (e.g., medium or high security). As shown in column 126, the facial recognition algorithm has identified a trusted user in the image data provided by the camera 103. Therefore, as shown in column 129 and the display 102, the notification is outputted on the mobile device 101.

Figure 1D:
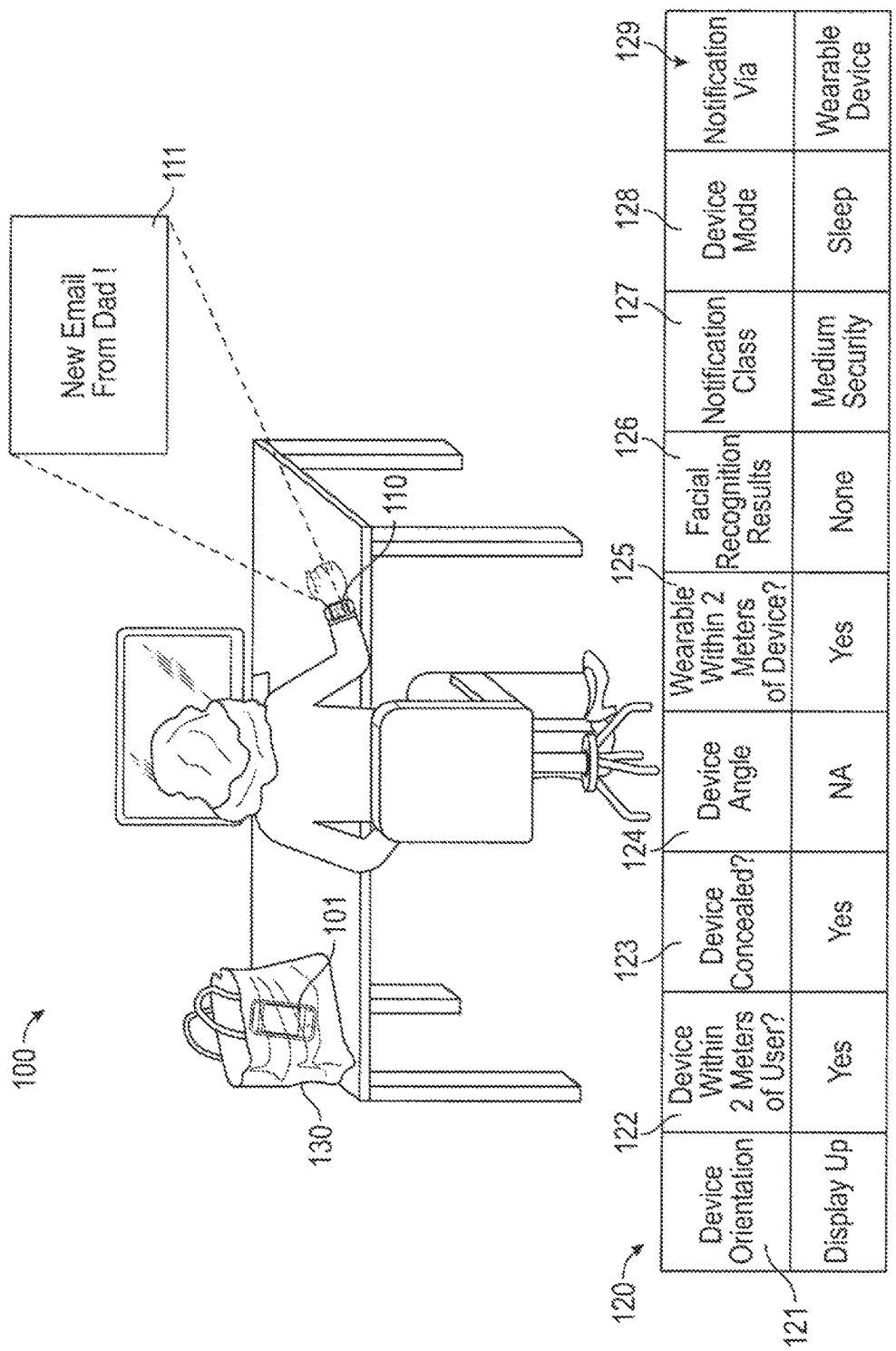

FIG. 1D depicts an embodiment where the mobile device 101 is concealed in a bag 130, and a notification is outputted on the wearable device 110. In at least one embodiment, a rule in the configuration data 120 specifies that if the mobile device 101 is concealed (e.g., in a pocket, purse, or bag), notifications must be sent to the wearable device 110. Therefore, in such embodiments, regardless of the determinations made for columns 121-122 and 124-128, if column 123 reflects that the mobile device 101 is concealed, the notification is sent to the wearable device 110. As previously indicated, the mobile device 110 may analyze image data provided by the camera 103 to determine that the mobile device 101 is concealed. For example, light levels in the image data may be lower when the mobile device 101 is concealed. Therefore, if the light levels in the image data are lower than a predefined light level threshold, the mobile device 101 may determine that the mobile device 101 is concealed and direct notifications to the wearable device 110.

Figure 2:
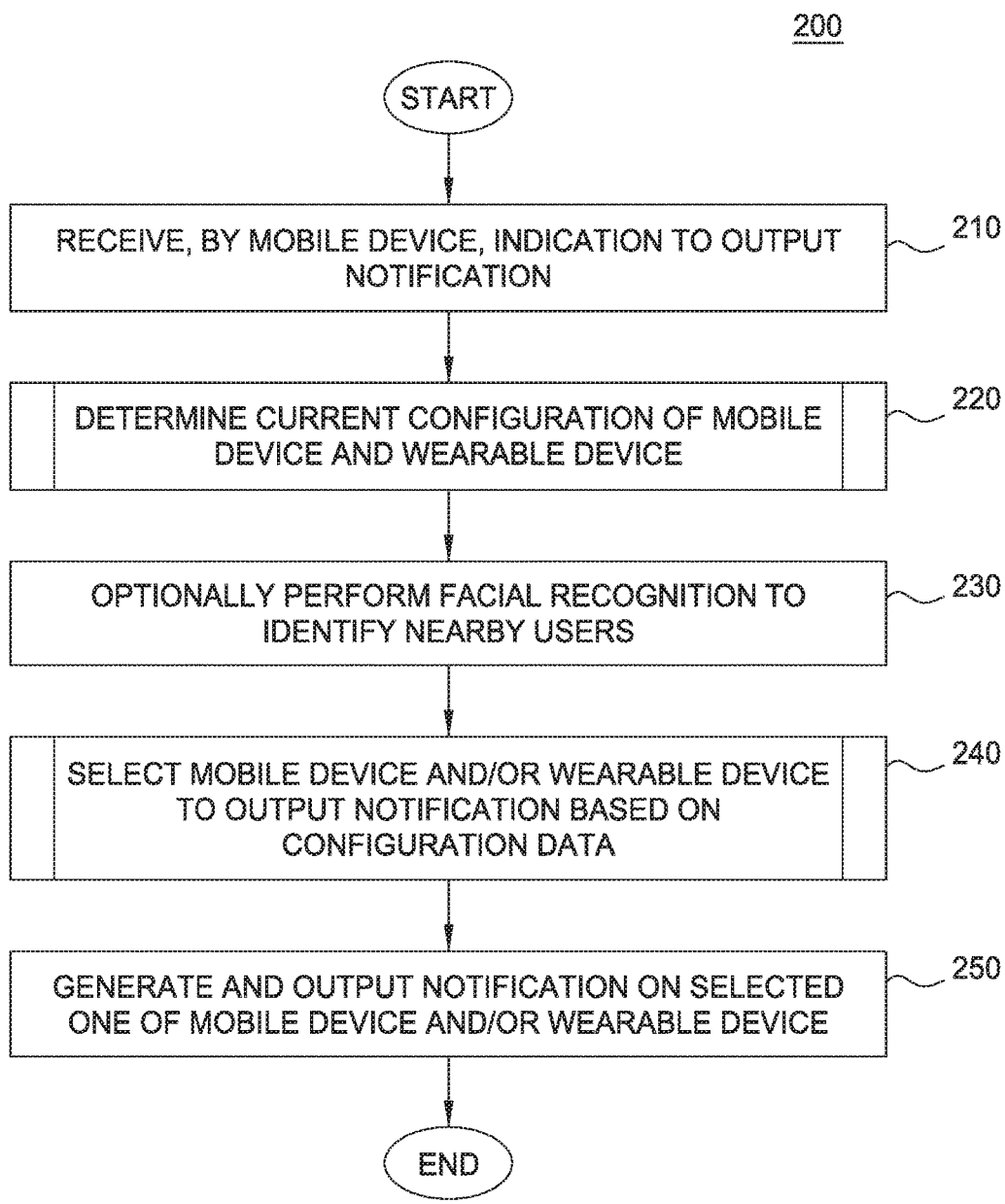
FIG. 2 is a flow chart illustrating an example method to provide intelligent notification redirection, according to one embodiment.

FIG. 2 is a flow chart illustrating an example method 200 to provide intelligent notification redirection, according to one embodiment. As shown, the method 200 begins at block 210, where the mobile device 101 receives an indication to output a notification. The indication may be received from an application executing on the mobile device 101 and/or the operating system of the mobile device 101. At block 220, described in greater detail with reference to FIG. 3, the mobile device 101 determines the current configuration of the mobile device 101 and the wearable device 110. For example, the mobile device 101 may determine that the mobile device 101 is placed with the display 102 face up, while the wearable device 110 is beyond a predefined distance threshold from the mobile device 101. Furthermore, the mobile device 101 may determine whether any users are in proximity of the mobile device 101.

At block 230, the mobile device 101 may optionally perform facial recognition to identify any nearby users that are detected in the image data provided by the camera 103 of the mobile device 101. In at least one embodiment, the mobile device 101 performs facial recognition when a rule in the configuration data 120 requires facial recognition before outputting a notification on the mobile device 101 and/or the wearable device 110. For example, a rule in the configuration data 120 may require the mobile device 101 to verify that the owner of the mobile device 101 and/or the wearable device 110 is in the image data provided by the camera 103 when confidential or other sensitive information is contained in the notification. Doing so prevents the disclosure of confidential or sensitive information to unauthorized users. If the mobile device 101 identifies a corresponding user, the mobile device 101 may update the configuration data 120 accordingly.

At block 240, described in greater detail with reference to FIG. 4, the mobile device 101 selects the mobile device 101 and/or the wearable device 110 to output the notification based on the configuration data 120. For example, if the mobile device 101 determines that the user's back is facing the mobile device 101 based on an analysis of the image data provided by the camera 103, the mobile device 101 may select the wearable device 110 to output the notification, as the mobile device 101 is not within the current viewing range of the user. At block 250, the mobile device 101 generates the notification and outputs the notification on the mobile device 101 and/or wearable device 110 selected at block 240. If the wearable device 110 is selected at block 240, the mobile device 101 will also transmit an indication of the notification to the wearable device 110 via a wireless data connection.

Figure 3:
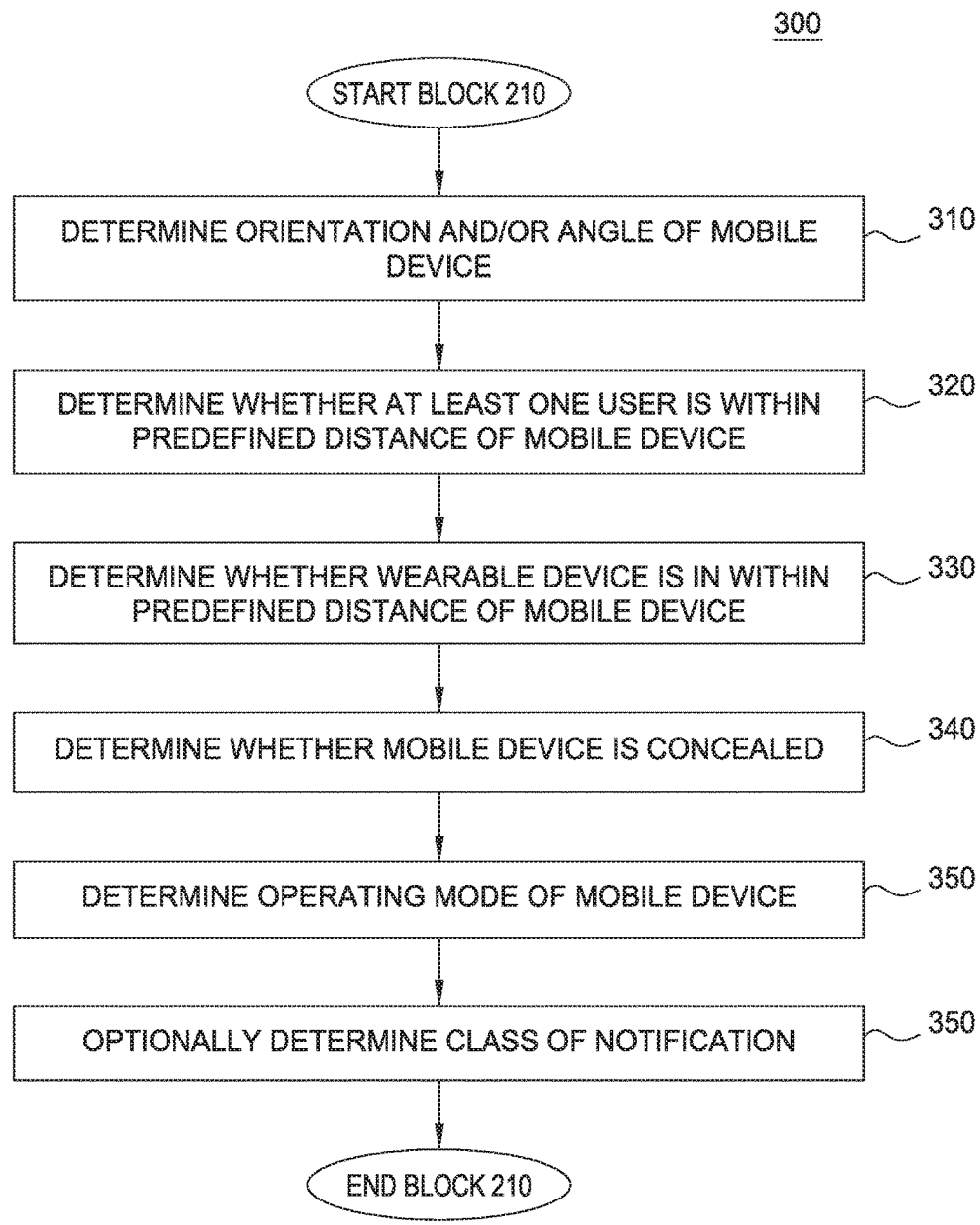
FIG. 3 is a flow chart illustrating an example method to determine a current configuration of a mobile device and a wearable device, according to one embodiment.

FIG. 3 is a flow chart illustrating an example method 300 corresponding to block 220 to determine a current configuration of a mobile device and a wearable device, according to one embodiment. As shown, the method 300 begins at block 310, where the mobile device 101 uses accelerometer data to determine the orientation of the mobile device 101. For example, the accelerometer data may indicate that the mobile device 101 is placed with the display 102 facing down. The mobile device 101 may further determine the angle of the mobile device 101 based on the accelerometer data. For example, the mobile device 101 may determine whether the angle of the mobile device 101 indicates the mobile device 101 is resting on a stand. The mobile device 101 may further consider whether the angle of the mobile device 101 is within a threshold. For example, the configuration data 120 may specify different angles corresponding to different orientations of the mobile device 101 (e.g., 0 degrees for screen facing up, 180 degrees for screen facing down, 80 degrees for being placed on a stand, and 60 degrees for being held in the user's hand). However, these angles may include threshold (e.g., plus and/or minus 10 degrees) values. Therefore, if the angle of the mobile device 101 is 5 degrees, (and therefore within the example threshold), the mobile device 101 may determine that the mobile device 101 is oriented with the screen facing up.

At block 320, the mobile device 101 determines whether at least one user is within a predefined distance of the mobile device 101. The mobile device 101 may use any technique to determine whether users are within the predefined distance of the mobile device 101. For example, the mobile device 101 may analyze data from a microphone to determine whether human speech is detected, indicating at least one person is near the mobile device 101. As another example, the mobile device 101 may analyze image data provided by the camera 103 to determine whether at least one person is present. The mobile device 101 may determine the distance of identified persons in the image data by any technique, such as measuring the distance between the eyes of a person to determine how far the person is from the mobile device 101. As yet another example, in some embodiments, the mobile device 101 may associate the location of a wearable device 110 with a user. If a wearable device 110 is detected, the mobile device 101 may associate the location of the wearable device 110 with the user.

At block 330, the mobile device 101 determines whether a wearable device 110 is within a predefined distance of the mobile device 101. Generally, the mobile device 101 may establish wireless communications with the wearable device 110, and use the strength and frequency of the wireless signal to determine the distance of the wearable device 110. As another example, the mobile device 101 and the wearable device 101 may use the iBeacon® protocol to determine the distance between the devices. At block 340, the mobile device 101 determines whether the mobile device 101 is concealed (e.g., in a bag, purse, or pocket). The mobile device 101 may analyze image data provided by the camera 103 to determine whether the mobile device 101 is concealed. For example, the mobile device 101 may identify keys and a wallet in the image data, and determine that the mobile device 101 is concealed in a purse or bag. Additionally and/or alternatively, the mobile device 101 may determine whether the amount of light in the image data exceeds a threshold. If the amount of light in the image data is below the threshold, the mobile device 101 may determine that the mobile device 101 is concealed.

At block 350, the mobile device 101 determines the current operating mode of the mobile device 101. For example, the operating system of the mobile device 101 may reflect that the mobile device 101 is locked, in sleep mode, and/or unlocked (and currently in use). At block 360, the mobile device 101 optionally determines the class of the notification received at block 210. The mobile device 101 may determine the notification class based on a notification class assigned to the notification by the entity (e.g., application, operating system, etc.) that generated the notification, based on a notification class assigned to the entity that generated the notification, and/or an analysis of the contents of the notification. Generally, the mobile device 101 may store attributes for any the determinations made at blocks 310-360 in the configuration data 120. Doing so allows the mobile device 101 to apply one or more rules in the configuration data 120 to the attributes of the mobile device 101, wearable device 110, and/or the notification, to determine whether to output the notification on the mobile device 101 and/or the wearable device 110.

Figure 4:
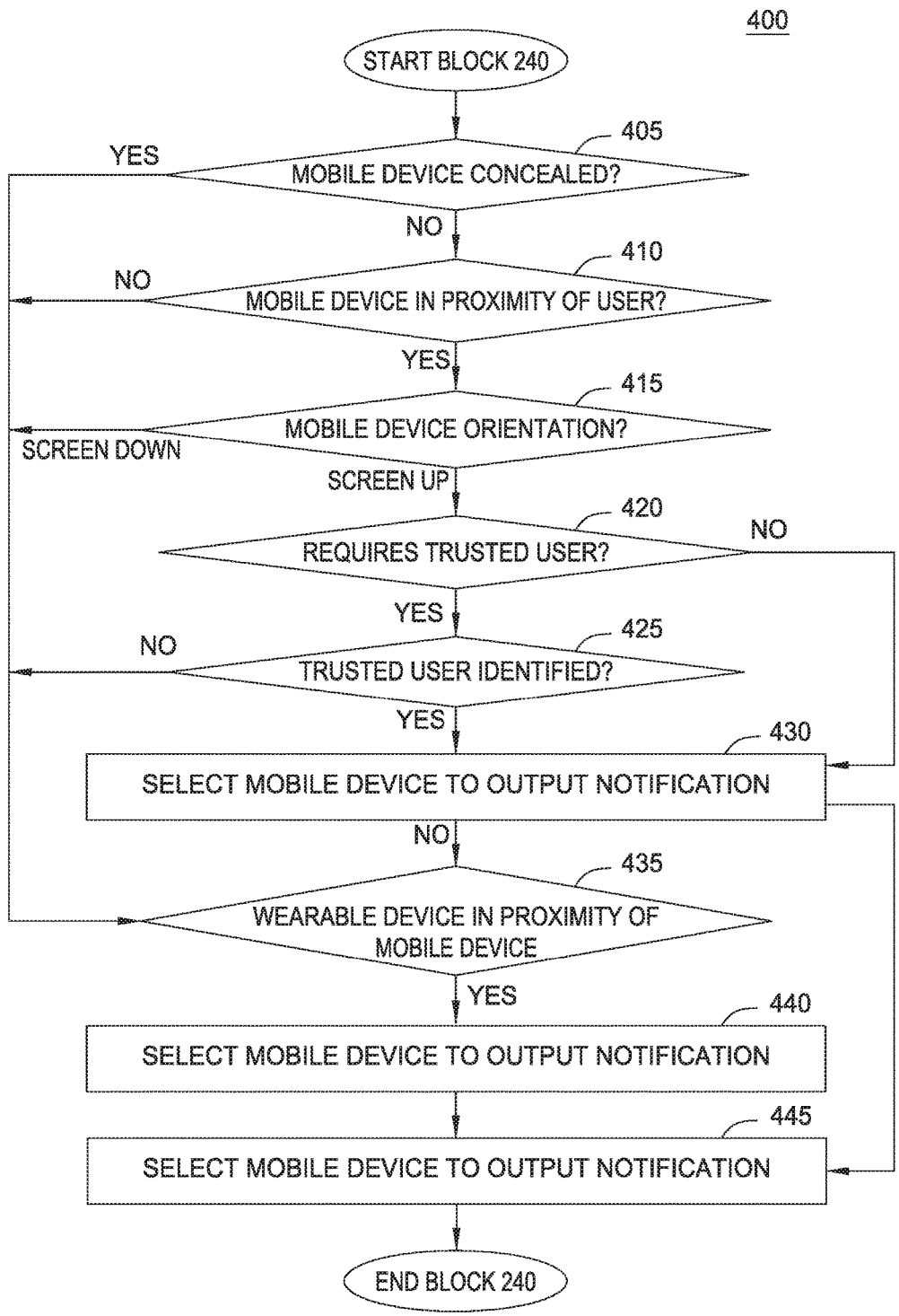
FIG. 4 is a flow chart illustrating an example method to select a mobile device and/or a wearable device to output a notification, according to one embodiment.

FIG. 4 is a flow chart illustrating an example method 400 corresponding to block 240 to select a mobile device and/or a wearable device to output a notification, according to one embodiment. As shown, the method begins at block 405, where the mobile device 101 determines whether the mobile device 101 is concealed based on data stored in the configuration data 120. For example, at block 340, the mobile device 101 may determine that the mobile device 101 is concealed in a bag based on light levels in image data provided by the camera 103. The mobile device 101 may store a corresponding indication in the configuration data 120, which the mobile device 101 may use at block 405. If the mobile device 101 is concealed, the method proceeds to block 435. If the mobile device 101 is not concealed, the method proceeds to block 410.

At block 410, the mobile device 101 determines whether a user is in proximity of the mobile device 101 based on data stored in the configuration data 120. As previously indicated, the mobile device 101 may make the determination at block 320, and store an indication of whether one or more people are within a predefined distance of the mobile device 101 in the configuration data. If the mobile device 101 is not within proximity of at least one user, the method proceeds to block 435. If the mobile device 101 is within proximity of at least one user, the method proceeds to block 415. At block 415, the mobile device 101 determines the current orientation of the mobile device 101 based on the configuration data 120. If the mobile device 101 is oriented with the screen facing down, the method proceeds to block 435. If the mobile device 101 is oriented with the screen facing up, the mobile device 101 proceeds to block 420.

At block 420, the mobile device 101 determines, based on the configuration data 120, whether outputting the notification requires the presence of a trusted user. The mobile device 101 may determine the notification requires the presence of a trusted user in any number of ways. For example, the notification class of the notification may be associated with a rule in the configuration data 120 requiring the presence of a specific user (or set of users). As another example, the configuration data 120 may include a rule specifying that a trusted user must be identified when the wearable device is not within proximity of the user, and the mobile device 101 is in sleep mode. As yet another example, a user may specify a rule in the configuration data 120 that requires the detection of a trusted user for all notifications outputted on the mobile device 101 and/or the wearable device 110. If a trusted user is not required, the method proceeds to block 430. If a trusted user is required, the method proceeds to block 425, where the mobile device 101 determines whether the trusted user is identified. As previously indicated, to identify a trusted user, the mobile device 101 may perform facial recognition on image data provided by the camera 103, and/or compare words spoken by the user to known voice data of the user to identify the trusted user. The mobile device 101 may store an indication of the identified users in the configuration data 120. If the trusted user is not identified, the method proceeds to block 435. If the trusted user is identified, the method proceeds to block 430. At block 430, the mobile device 101 selects the mobile device 101 to output the notification. The method then proceeds to block 445.

At block 435, the mobile device 101 determines whether a wearable device 110 is in proximity of the mobile device 101. If the wearable device 110 is not in proximity of the mobile device 101, the method returns to block 430, where the mobile device 101 is selected to output the notification. If the mobile device 101 is within proximity of the wearable device, the method proceeds to block 440, where the wearable device 110 is selected to output the notification. At block 445, the selected device (e.g., the mobile device 101 or the wearable device 110) is returned.

Figure 5:
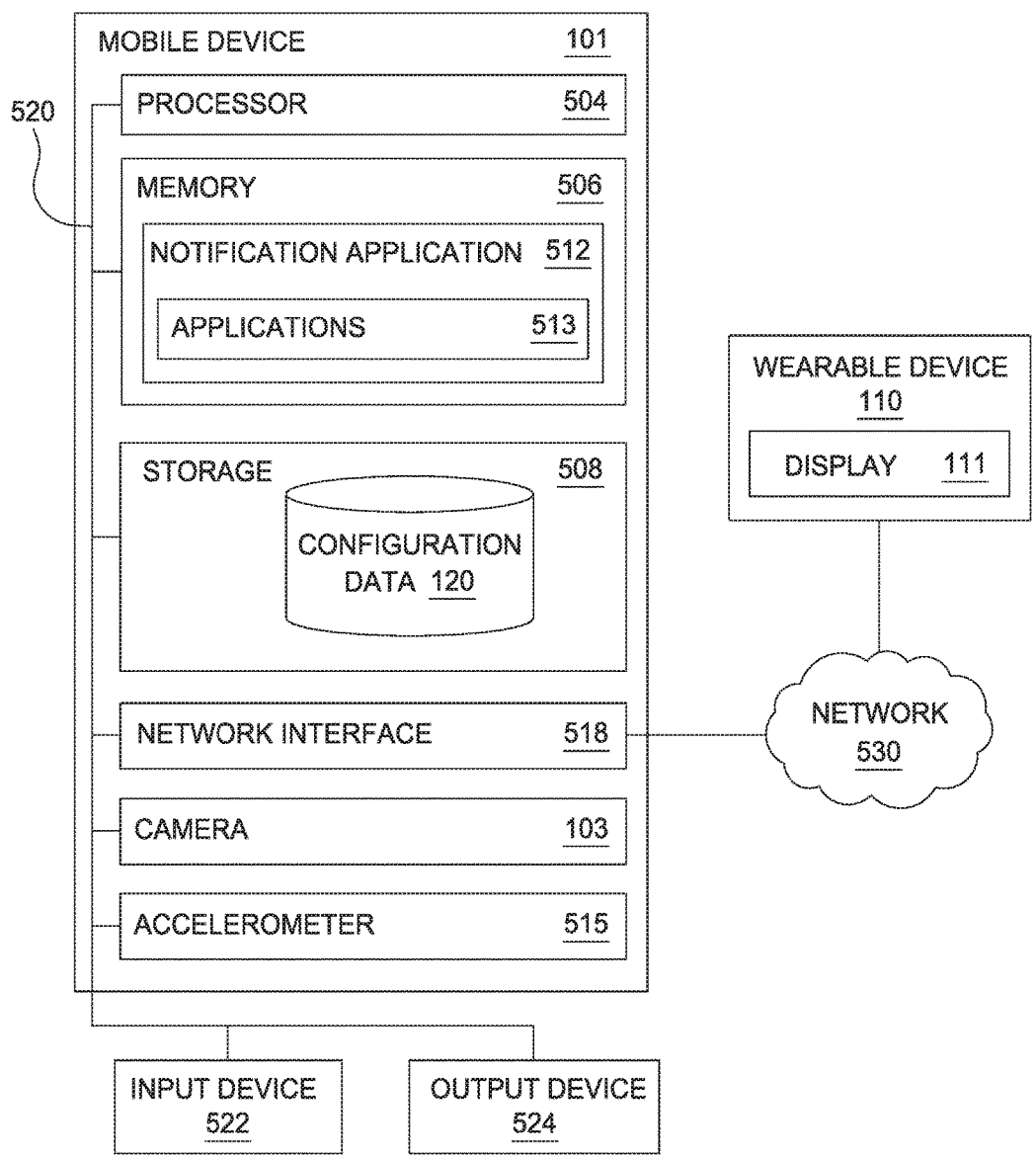
FIG. 5 illustrates an example system which implements intelligent notification redirection, according to one embodiment.

FIG. 5 illustrates an example system which implements intelligent notification redirection, according to one embodiment. The networked system 500 includes the mobile device 101. The mobile device 101 may also be connected to other computers and devices (e.g., the wearable device 110) via a network 530. In general, the network 530 may be a telecommunications network and/or a wide area network (WAN). In a particular embodiment, the network 530 is the Internet.

The mobile device 101 generally includes a processor 504 which obtains instructions and data via a bus 520 from a memory 506 and/or a storage 508. The mobile device 101 may also include the camera 103, an accelerometer 515, one or more network interface devices 518, input devices 522, and output devices 524 connected to the bus 520. The mobile device 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the mobile device 101 to communicate with other computers via the network 530. The wearable device 110 similarly includes a processor, memory, storage, network interface, and input/output devices, each not pictured.

The storage 508 is representative of hard-disk drives, solid state drives, flash memory devices, optical media and the like. Generally, the storage 508 stores application programs and data for use by the mobile device 101. In addition, the memory 506 and the storage 508 may be considered to include memory physically located elsewhere; for example, on another computer coupled to the mobile device 101 via the bus 520.

The input device 522 may be any device for providing input to the mobile device 101. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the mobile device 101. The output device 524 may include output devices such as monitors, touch screen displays, and so on.

As shown, the memory 506 contains the notification application 512 and a plurality of applications 513. The notification application 512 is configured to direct notifications generated by the applications 513 (and/or the operating system of the mobile device 101) to the mobile device 101 and/or the wearable device 110, as described in greater detail above. The notification application 513 is generally configured to implement all functionality described herein with reference to FIGS. 1A-5.

As shown, the storage 508 contains the configuration data 120. The notification application 512 may populate the configuration data 120 with metadata describing the mobile device 101, wearable device 110, and/or the notification for each of a plurality of notifications. The configuration data 120 may further include rules for intelligently redirecting notifications to the mobile device 101 and/or the wearable device 110, as described in greater detail above.

Advantageously, embodiments disclosed herein provide techniques to intelligently redirect notifications to a mobile device or a paired wearable device. By intelligently redirecting notifications, the performance of the mobile device and wearable device is improved, allowing each device to output only those notifications where doing so is most likely to catch the attention of the intended user. By reducing the number of erroneously outputted notifications, the freed resources of the mobile and wearable device may be allocated to other tasks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the notification application 512 could execute on a computing system in the cloud. In such a case, the notification application may store configuration data 120 for a plurality of notifications, users, and/or devices at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
receiving, by a mobile device, an indication to output a notification;
determining an orientation of the mobile device;
determining a location of a wearable device relative to the mobile device;
determining that a notification class of the notification requires a proximity criterion to be satisfied;
determining that a relative positioning of the first user and the mobile device satisfy the proximity criterion by:
applying a facial recognition algorithm to image data provided by a camera of the mobile device; and
determining, based on the facial recognition algorithm, that the first user is present in the image data; and
selecting, based on the determined orientation of the mobile device and the location of the wearable device relative to the mobile device, at least one of the mobile device and the wearable device to output the notification.

2. The method of claim 1, wherein the orientation of the mobile device is determined based on a determined angle of orientation of the mobile device, wherein the angle of orientation of the mobile device is determined based on data provided by an accelerometer of the mobile device, wherein the at least one of the mobile device and the wearable device are selected based on a first rule of a plurality of rules for outputting notifications, the method further comprising:
outputting the notification on the selected at least one of the mobile device and the wearable device.

3. The method of claim 2, further comprising:
determining that the orientation of the mobile device comprises an orientation with a display of the mobile device facing down; and
determining that the first rule of the plurality of rules requires the notification to be outputted on the wearable device,
wherein selecting the at least one of the mobile device and the wearable device comprises selecting the wearable device based on the orientation of the mobile device, the location of the wearable device, and the first rule.

4. The method of claim 2, further comprising:
determining that the orientation of the mobile device comprises an orientation with a display of the mobile device facing up; and
determining that the first rule of the plurality of rules requires the notification to be outputted on the mobile device,
wherein selecting the at least one of the mobile device and the wearable device comprises selecting the mobile device based on the orientation of the mobile device, the user identified in proximity of the mobile device, and the first rule.

5. The method of claim 1, further comprising:
determining that the wearable device is located at a distance from the mobile device that exceeds a distance threshold,
wherein the mobile device is selected to output the notification based on the distance exceeding the threshold and the identified first user in proximity of the mobile device.

6. The method of claim 1, further comprising:
determining that a light level of image data provided by the camera of the mobile device exceeds a light threshold; and
determining that the mobile device is not concealed,
wherein the mobile device is selected to output the notification further based on the determination that the mobile device is not concealed.

7. A computer program product, comprising:
a non-transitory computer-readable storage medium having computer readable program code embodied therewith, the computer readable program code executable by a processor to perform an operation comprising:
receiving, by a mobile device, an indication to output a notification;
determining an orientation of the mobile device;
determining a location of a wearable device relative to the mobile device;
determining that a notification class of the notification requires a proximity criterion to be satisfied;
determining that a relative positioning of the first user and the mobile device satisfy the proximity criterion by:
applying a facial recognition algorithm to image data provided by a camera of the mobile device; and
determining, based on the facial recognition algorithm, that the first user is present in the image data; and
selecting, based on the determined orientation of the mobile device and the location of the wearable device relative to the mobile device, at least one of the mobile device and the wearable device to output the notification.

8. The computer program product of claim 7, wherein the orientation of the mobile device is determined based on a determined angle of orientation of the mobile device, wherein the angle of orientation of the mobile device is determined based on data provided by an accelerometer of the mobile device, wherein the at least one of the mobile device and the wearable device are selected based on a first rule of a plurality of rules for outputting notifications, the operation further comprising:
outputting the notification on the selected at least one of the mobile device and the wearable device.

9. The computer program product of claim 8, the operation further comprising:
determining that the orientation of the mobile device comprises an orientation with a display of the mobile device facing down; and
determining that the first rule of the plurality of rules requires the notification to be outputted on the wearable device,
wherein selecting the at least one of the mobile device and the wearable device comprises selecting the wearable device based on the orientation of the mobile device, the location of the wearable device, and the first rule.

10. The computer program product of claim 8, the operation further comprising:
determining that the orientation of the mobile device comprises an orientation with a display of the mobile device facing up; and
determining that the first rule of the plurality of rules requires the notification to be outputted on the mobile device,
wherein selecting the at least one of the mobile device and the wearable device comprises selecting the mobile device based on the orientation of the mobile device, the user identified in proximity of the mobile device, and the first rule.

11. The computer program product of claim 7, the operation further comprising:
determining that the wearable device is located at a distance from the mobile device that exceeds a distance threshold,
wherein the mobile device is selected to output the notification based on the distance exceeding the threshold and the identified first user in proximity of the mobile device.

12. The computer program product of claim 7, the operation further comprising:
determining that a light level of image data provided by the camera of the mobile device exceeds a light threshold; and
determining that the mobile device is not concealed,
wherein the mobile device is selected to output the notification further based on the determination that the mobile device is not concealed.

13. A mobile device, comprising:
a processor; and
a memory storing one or more instructions which, when executed by the processor, performs an operation comprising:
receiving, by a mobile device, an indication to output a notification;
determining an orientation of the mobile device;
determining a location of a wearable device relative to the mobile device;

determining that a notification class of the notification requires a proximity criterion to be satisfied;

determining that a relative positioning of the first user and the mobile device satisfy the proximity criterion by:

applying a facial recognition algorithm to image data provided by a camera of the mobile device; and determining, based on the facial recognition algorithm, that the first user is present in the image data; and selecting, based on the determined orientation of the mobile device and the location of the wearable device relative to the mobile device, at least one of the mobile device and the wearable device to output the notification.

14. The mobile device of claim 13, wherein the orientation of the mobile device is determined based on a determined angle of orientation of the mobile device, wherein the angle of orientation of the mobile device is determined based on data provided by an accelerometer of the mobile device, wherein the at least one of the mobile device and the wearable device are selected based on a first rule of a plurality of rules for outputting notifications, the operation further comprising:

outputting the notification on the selected at least one of the mobile device and the wearable device.

15. The mobile device of claim 14, the operation further comprising:

determining that the orientation of the mobile device comprises an orientation with a display of the mobile device facing down; and determining that the first rule of the plurality of rules requires the notification to be outputted on the wearable device, wherein selecting the at least one of the mobile device and the wearable device comprises selecting the wearable device based on the orientation of the mobile device, the location of the wearable device, and the first rule.

16. The mobile device of claim 14, the operation further comprising:

determining that the orientation of the mobile device comprises an orientation with a display of the mobile device facing up; and determining that the first rule of the plurality of rules requires the notification to be outputted on the mobile device, wherein selecting the at least one of the mobile device and the wearable device comprises selecting the mobile device based on the orientation of the mobile device, the user identified in proximity of the mobile device, and the first rule.

17. The mobile device of claim 13, the operation further comprising:

determining that the wearable device is located at a distance from the mobile device that exceeds a distance threshold, wherein the mobile device is selected to output the notification based on the distance exceeding the threshold and the identified first user in proximity of the mobile device.

* * * * *